United States Patent [19]
Chen

[11] Patent Number: 5,832,158
[45] Date of Patent: Nov. 3, 1998

[54] OPTICAL FIBER INNER TUBE CONNECTOR

[76] Inventor: Chung-Fang Chen, 4500 E. Cerro Vista Dr., Anaheim, Calif. 92807

[21] Appl. No.: 825,234

[22] Filed: Mar. 27, 1997

[51] Int. Cl.⁶ ........................................... G02B 6/36
[52] U.S. Cl. .................................. 385/53; 385/78; 385/87
[58] Field of Search ................... 385/100–114, 134–139, 385/53, 78, 87

[56] References Cited

U.S. PATENT DOCUMENTS

| | | | |
|---|---|---|---|
| 4,737,009 | 4/1988 | Kakii et al. | 385/78 |
| 5,644,673 | 7/1997 | Patterson | 385/87 X |

*Primary Examiner*—Phan T. H. Palmer
*Attorney, Agent, or Firm*—W. Wayne Liauh

[57] ABSTRACT

An optic fiber inner tube connector includes an elongated body having a central bore extending along a central axis and two threaded sections on the outside surface for engaging inner-threaded end caps. Each end cap has a circumferential, inward flange having an inside diameter sufficient to allow the inner tube segment to extend therethrough. An axially movable retainer ring is provided between the flange of the end cap and the axial end of the body and having a circumferential channel spaced from the end of the body for holding therebetween a sealing ring which is deformable to sealingly engage the inner tube segment when the retainer ring is moved toward the body. A gripping ring is provided between the flange of the end cap and the retainer ring, having an outside surface in wedging engagement with both the end cap and the retainer ring and an inside surface having fine sharp teeth formed thereon for piercing into and catching the inner tube segment when the gripping ring is deformed inward due to the wedging force caused by the axial movement of the end cap. A resilient centering and sealing ring is provided inside the central bore and associated with each of the inner tube segments, having an inclined face which radially centers the inner tube segment in the body and hermetically seals the end of the inner tube segment when the end of the inner tube segment is forced into contact with the centering and sealing ring.

16 Claims, 10 Drawing Sheets

OPTICAL FIBER INNER TUBE CONNECTOR

FIELD OF THE INVENTION

The present invention relates to an optic fiber inner tube connector and in particular to an optic fiber inner tube connector which allows ready site connection with improved air- and humidity-tightness and stretching resistance.

BACKGROUND OF THE INVENTION

With the development of communication industry, conventional copper cables adapted in the telecommunication system have been gradually replaced by more efficient and light-weighted optic fiber cables. However, due to the fragility of the optic fiber, the optic fiber cable requires more severe protection. In general, an optic fiber cable comprises an outer tube inside which three or four inner tubes are received. Each of the inner tubes has an optic fiber extending therethrough. Currently, the outer tube of the optic fiber cable is made of polyvinyl chloride and the inner tube is made of polyethylene.

In an actual operation of installation of the optic fiber cable, the outer tube is first embedded under ground. Thereafter the inner tubes, each of which is comprised of a plurality of separate segments, are put into the outer tube segment by segment and then the segments of each of the inner tubes are connected by means of a connector which is referred to as inner tube connector herein. Finally, the optic fiber is inserted through each of the inner tubes by means of compressed air. The compressed air brings the optic fiber from one end of the inner tube to an opposite end. To effectively make use of the compressed air to move the optic fiber through the inner tube, the inner tube has to be air-tight, namely, the inner tube has to be hermetic through the whole length thereof, including the connection made by the connector. Thus air-tightness of the connection between two segments of the inner tube is of vital importance in using compressed air to move the optic fiber through the inner tube.

In addition, the air-tightness of the inner tube connector is also important in protecting the optic fiber from being damaged by invasion of humidity, insects or unwanted foreign objects. Thus, how to efficiently and effectively connecting two segments of an optic fiber inner tube in the working sites is a topic that requires continuous study and development for the optic fiber industry.

Further, in order to provide the connection between two segments of the inner tube with a sufficient strength to prevent the inner tube segments from separating from each other in the installing operation, the inner tube segments have to be securely and firmly attached to the connector once they are connected by the connector in order to resist the stretching force applied thereto.

In addition, since the inner tubes may be supplied by different manufacturers and since the tolerance of the outside diameter of the inner tubes usually has no strict requirement, the connector that is used to connect two inner tube segments has to accommodate the outside diameter tolerances of the inner tubes from different suppliers. For example, the inner tubes of a nominal outside diameter of 1¼" that are currently available in the market usually have several different values of the actual outside diameter and the maximum difference therebetween may as large as 6 mm. The conventional inner tube connectors that are currently available are incapable to effectively handle the variations in the tolerance of the outside diameter of the inner tubes in order to provide an effective air-tightness between the inner tube segments.

Further, in order to allow the inner tube segments to be readily inserted into the connector to be secured thereto, a radial clearance is usually provided between the connector casing and the inner tube segments so that the two inner tube segments that are connected by the connector may not be in precise axial alignment with each other and radially offset with respect to each other. This causes problems in extending the optic fiber through the inner tube.

Thus an improvement over the conventional optic fiber inner tube connector is desired to overcome or reduce the above drawbacks or problems.

OBJECTS OF THE INVENTION

Therefore, an object of the present invention is to provide a optic fiber inner tube connector which allows an efficient and effective air tight connection of two inner tube segments to be readily done in the working site.

Another object of the present invention is to provide an optic fiber inner tube connector which provides a firm and secure attachment to the inner tube segments so as to be sufficiently resistant against the stretching and distortion applied to the inner tubes during the installing operation or otherwise applied thereto and thus securely holding the inner tube segments together.

A further object of the present invention is to provide an optic fiber inner tube connector which comprises two sealing members to provide an improved and more effective sealing engagement with the inner tube inserted therein so as to provide an air- and water-tight connection between two inner tube segments.

A further object of the present invention is to provide an optic fiber inner tube connector comprising a centering device for centering the inner tube segments connected by the connector to the radial center of the connector so as to have the two inner tube segments precisely aligned with each other in the axial direction.

A further object of the present invention is to provide an optic fiber inner tube connector which is capable to accommodate the manufacturing tolerances of the inner tube outside diameter up to ±5 mm so that the inner tubes bearing the same nominal outside diameter but having different actual outside diameters may be handled easily.

To achieve the above and other objects, there is provided an optic fiber inner tube connector comprising an elongated body having a central bore extending along a central axis and two threaded sections on the outside surface for engaging inner-threaded end caps. Each end cap has a circumferential, inward flange having an inside diameter sufficient to allow the inner tube segment to extend therethrough. An axially movable retainer ring is provided between the flange of the end cap and the axial end of the body and having a circumferential channel spaced from the end of the body for holding therebetween a sealing ring which is deformable to sealingly engage the inner tube segment when the retainer ring is moved toward the body. A gripping ring is provided between the flange of the end cap and the retainer ring, having an outside surface in wedging engagement with both the end cap and the retainer ring and an inside surface having fine sharp teeth formed thereon for piercing into and catching the inner tube segment when the gripping ring is deformed inward due to the wedging force caused by the axial movement of the end cap. A resilient centering and sealing ring is provided inside the central bore and associated with each of the inner tube segments, having an inclined face which radially centers the inner tube segment in the body and hermetically seals the end of the inner tube segment when the end of the inner tube segment is forced into contact with the centering and sealing ring.

BRIEF DESCRIPTION OF THE DRAWINGS

The present invention will be better understood from the following description of a preferred embodiment thereof, which is illustrative and not limitative, with reference to the attached drawings, wherein.

DETAILED DESCRIPTION OF THE PREFERRED EMBODIMENT

Figure 1:
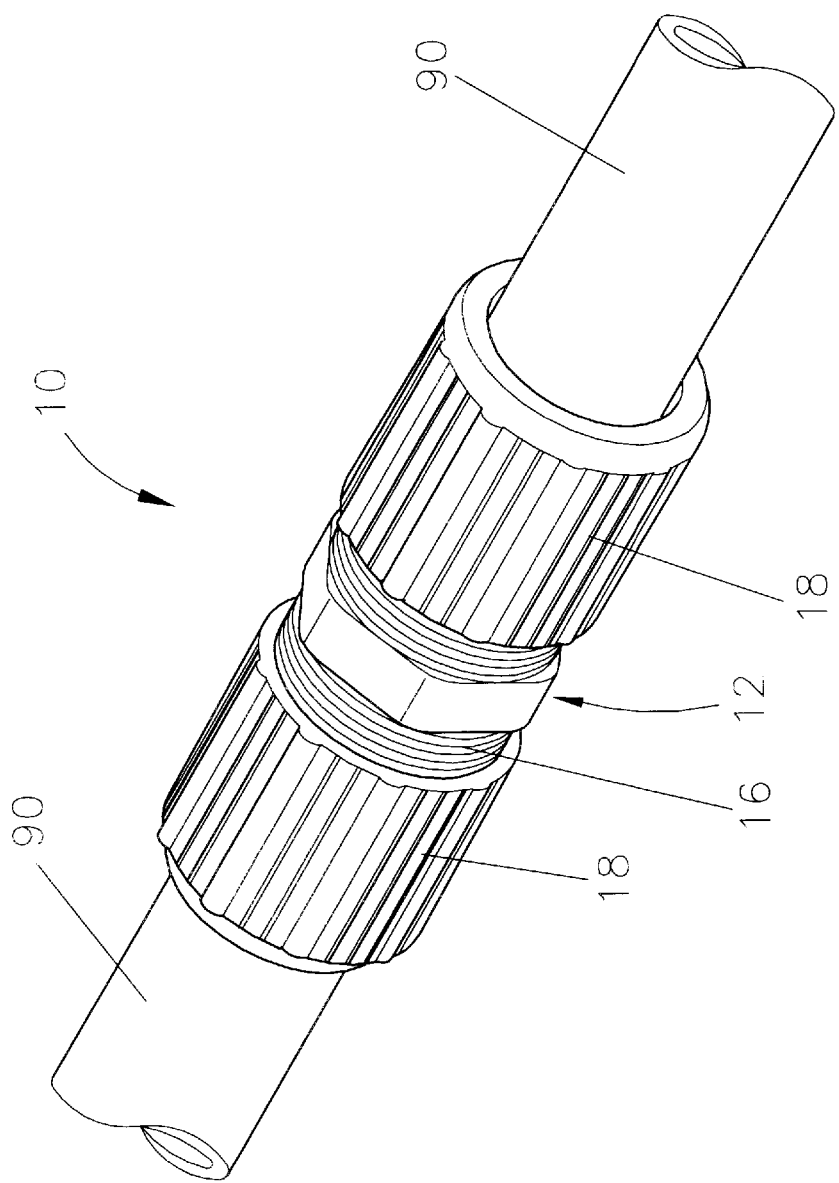
FIG. 1 is a perspective view showing an optic fiber inner tube connector constructed in accordance with the present invention with two inner tube segments connected thereto, optic fiber being omitted for clarity.

With reference to the drawings and in particular to FIG. 1, wherein an optic fiber inner tube connector constructed in accordance with the present invention, generally designated at the reference numeral 10, is shown, the optic fiber inner tube connector 10 (which will also be referred to as connector or inner tube connector for simplicity) is for connecting two segments of an optic fiber inner tube which are designated at reference numeral 90 (also see FIGS. 3 and 4, but the optic fiber that is received inside the inner tube segments 90 is not shown) in an axial direction so that the construction of the connector 10 at two axial end sides is symmetric about an axial center thereof For simplicity, the following description of the connector 10 is made to one of the two end sides thereof, but it is understood that the description is also applicable to the other end side construction. Further, the parts or members of the two end sides of the connector 10 bear the same reference numerals in the drawings.

Figure 2:
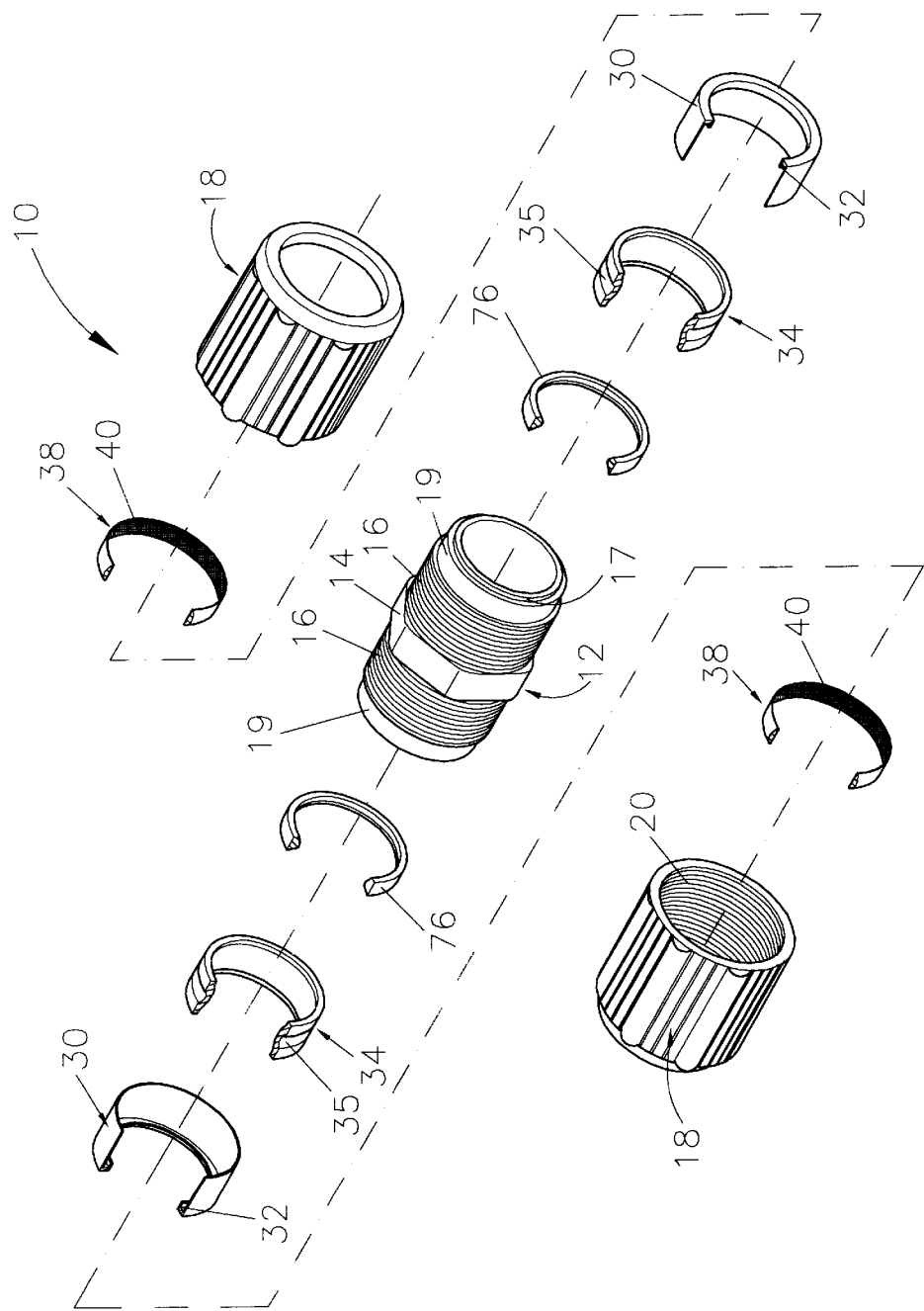
FIG. 2 is an exploded perspective view of the optic fiber inner tube connector in accordance with the present invention.

With reference to FIGS. 1 and 2 for a more detailed description of the connector 10, the connector 10 comprises an elongated cylindrical or tubular body 12 defining therein a central bore for receiving ends of the inner tube segments 90 and having a central axis extending in the axial direction of the connector 10. The construction of the cylindrical body 10 is particularly shown in FIG. 5. The cylindrical body 12 comprises a central section 14 and two externally threaded sections 16 on two axial sides of the central section 14 for threading engagement with inner-threaded end caps 18 (also see FIGS. 9 and 10). Axially outboard the threaded section 16, a non-threaded receiving section 19 with a diameter smaller than the nominal diameter of the threaded section 16 is provided on the cylindrical body 12. A circumferential shoulder 17 is further formed on the cylindrical body 12 at the outermost position in the axial direction. The receiving section 19 and the shoulder 17 will be further described hereinafter.

Preferably, the central section 14 of the cylindrical body 12 has a hexagon or other polygonal cross section for driving engagement with a hand tool, such as a pipe wrench or an adjustable wrench in tightening the end caps 18 to the cylindrical body 12.

Figure 6:
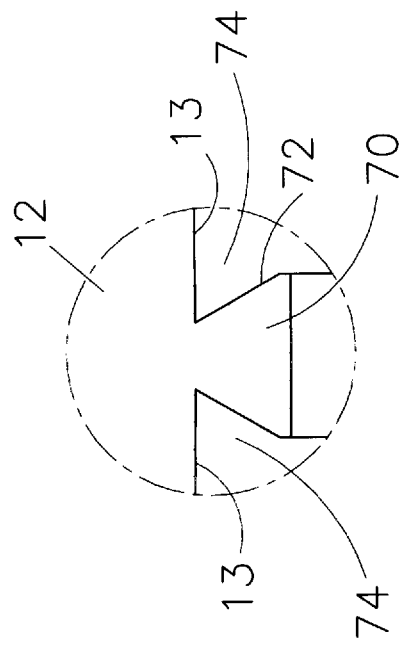
FIG. 6 is an enlarged view of the circled portion in FIG. 5.
Figure 5:
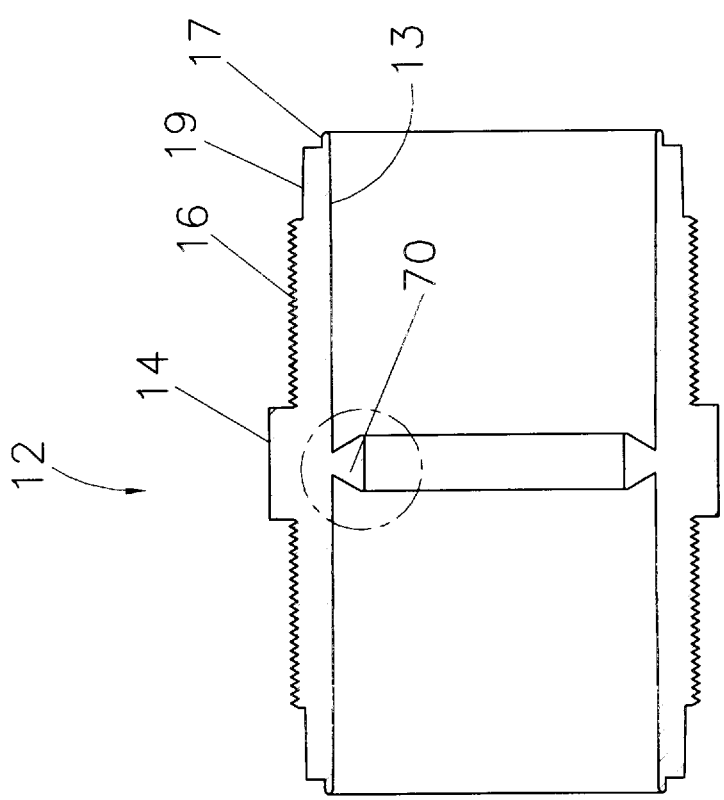
FIG. 5 is a cross-sectional view of the cylindrical body of the optic fiber inner tube connector in accordance with the present invention.

With reference to FIGS. 5 and 6, the cylindrical body 12 comprises a circumferential rib or raised portion 70 formed inside the central bore and preferably substantially axially centered. FIG. 6 shows an enlarged cross-sectional view of the circumferential rib 70. The rib 70 has a dove-tailed cross section, comprising an inclined face 72 on each of two axially opposite sides of the rib 70. The inclined face 72 is converged in an axially outward direction so as to define a wedge slot 74 with respect to the inner surface of the central bore of the cylindrical body 12, which wedge slot 74 has an included angle defined between the inclined face 72 and the inner surface of the central bore. The included angle may be of any suitable angle and in accordance with a preferred embodiment, the included angle is about 60°.

Figure 3:
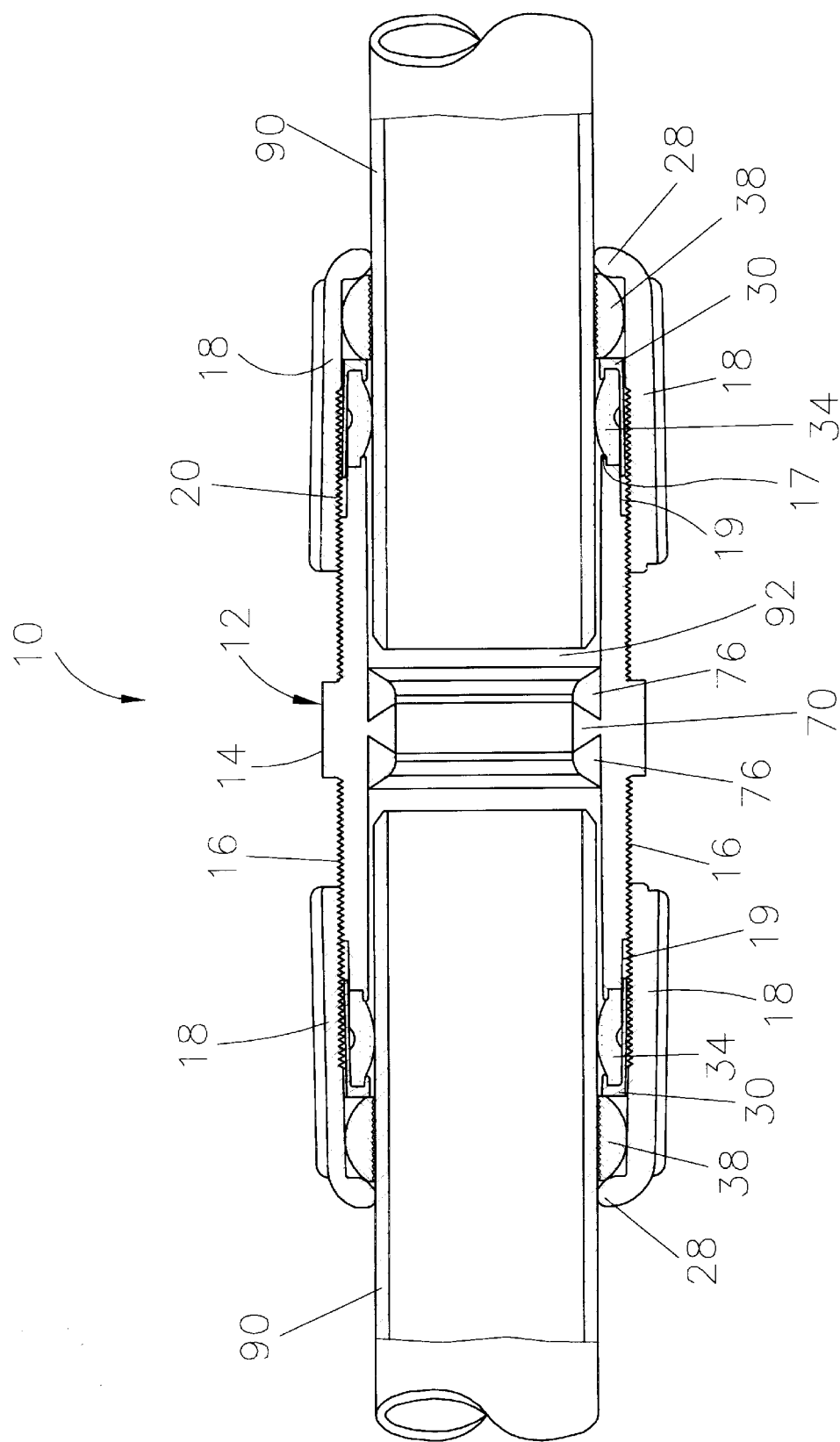
FIG. 3 is a cross-sectional view showing two inner tube segments inserted into the connector of the present invention with the end cap members not tightened.
Figure 4:
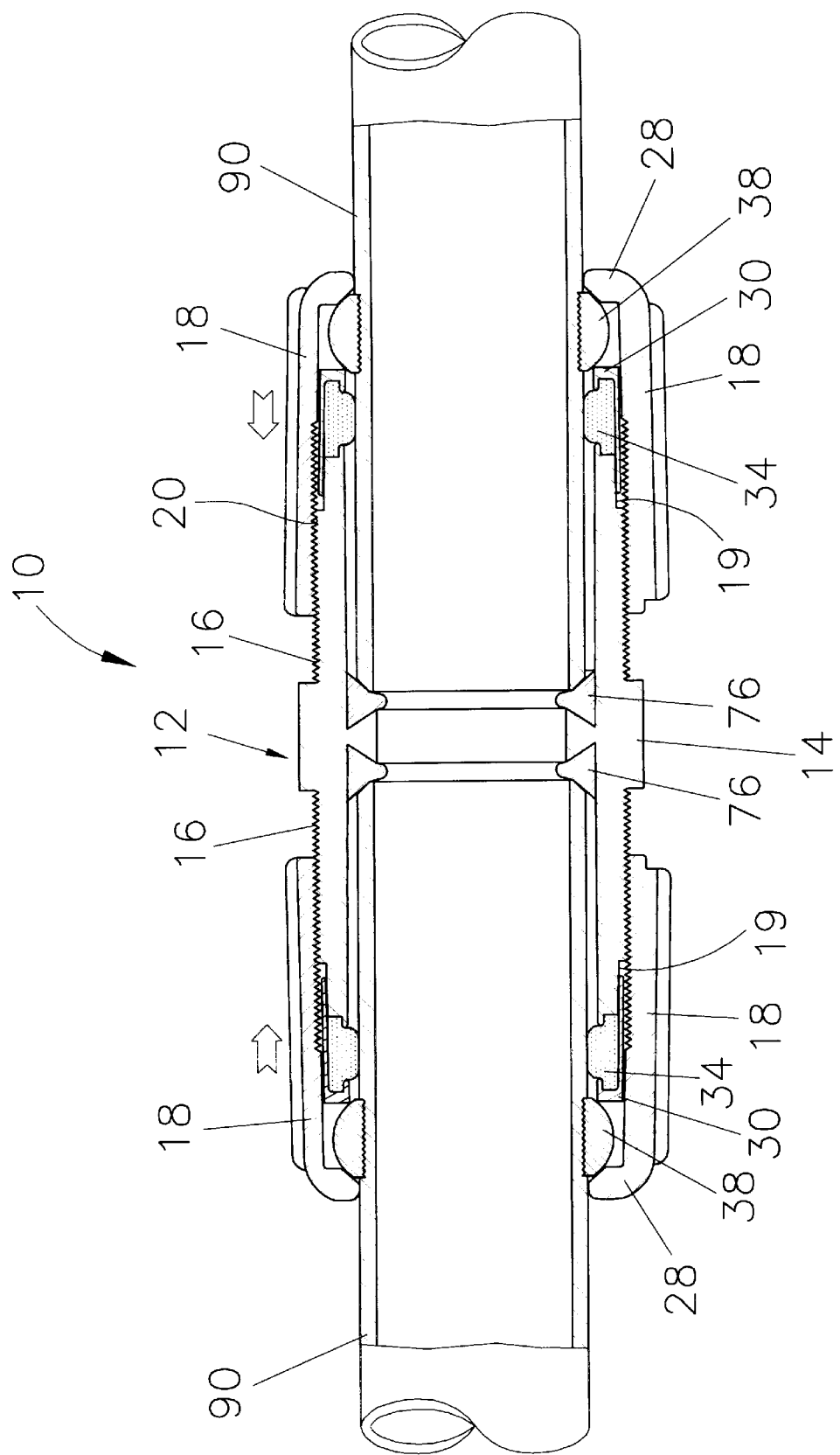
FIG. 4 is a cross-sectional view similar to FIG. 3 with the end cap members tightened so as to securely fix the inner tube segments inside the connector body.
Figure 13:
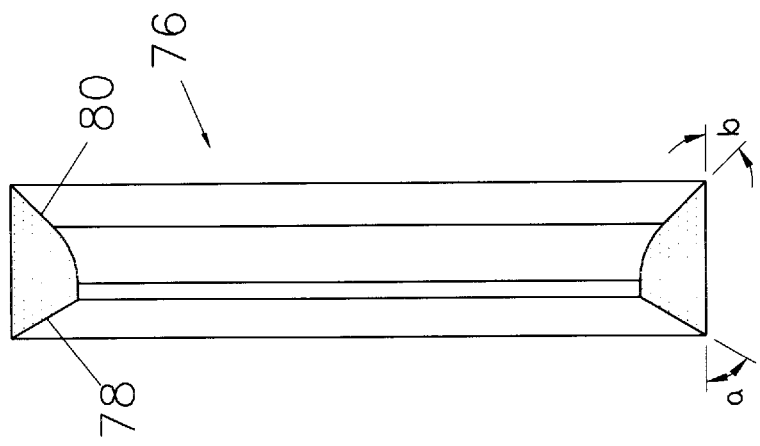
FIG. 13 is a cross-sectional view of the centering and sealing ring.
Figure 12:
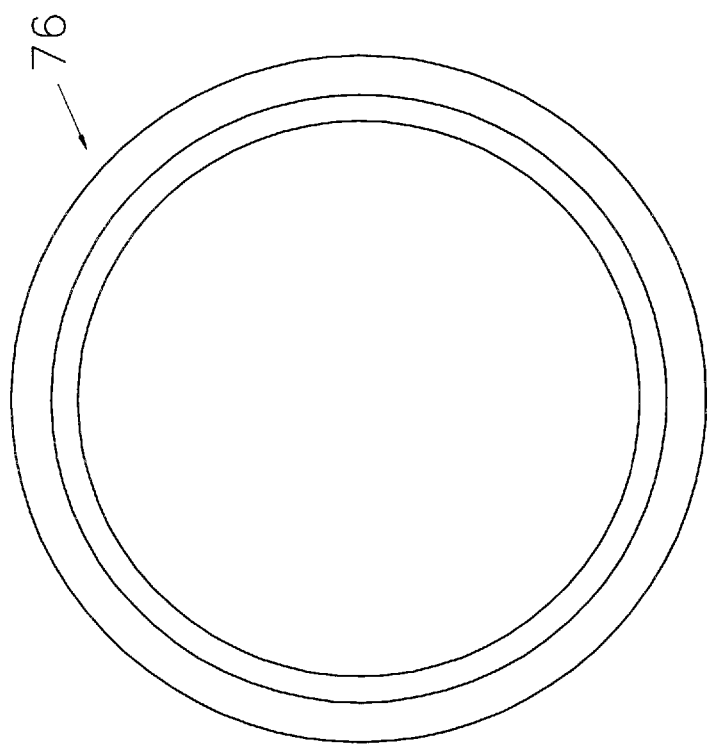
FIG. 12 is a front view of the centering and sealing ring of the optic fiber inner tube connector in accordance with the present invention

Each of the wedge slots 72 receives and holds a centering and sealing ring 76 therein. FIGS. 12 and 13 respectively show a front view and a cross-sectional view of the centering and sealing ring 76. FIGS. 3 and 4 show the mounting of the centering and sealing ring 76 within the respective wedge slot 74. The centering and sealing ring 76 has a central axis substantially coincident with the central axis of the cylindrical body 12 and comprises a first inclined face 78 formed on one of two axially opposite sides of the centering and sealing ring 76 which is defined by an angle a with respect to the circumferential outside surface of the centering and sealing ring 76 which is substantially identical to the included angle of the wedge slot 74 so as to allow the first inclined face 78 of the centering and sealing ring 76 to be fit into and held in the wedge slot 74. The centering and sealing ring 76 may be made of a resilient or deformable material that possesses a suitable friction coefficient with respect to the wedge slot 74 so as to hold the centering and sealing ring 76 within the wedge slot 74.

The centering and sealing ring 76 further comprises a second inclined face 80 provided on the second one of the two axially opposite sides of the centering and sealing ring 76 which is defined by an angle b with respect to the circumferential outside surface of the centering and sealing ring 76. The angle b is preferably smaller than the angle a and is to provide a camming engagement with the end of the inner tube segment 90 to center the inner tube segment 90 with respect to the central axis of the cylindrical body 12 or the central bore thereof. This will be further explained hereinafter. In a preferred embodiment, the angle b is about 45°.

Figure 11:
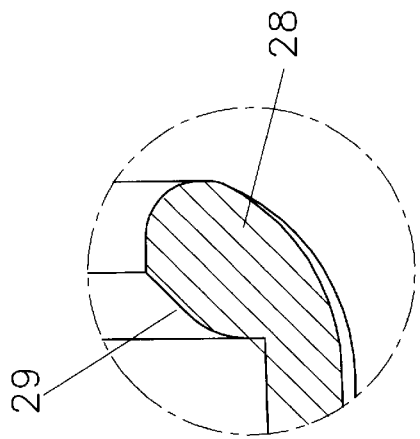
FIG. 11 is an enlarged view of the circled portion in FIG. 10.
Figure 10:
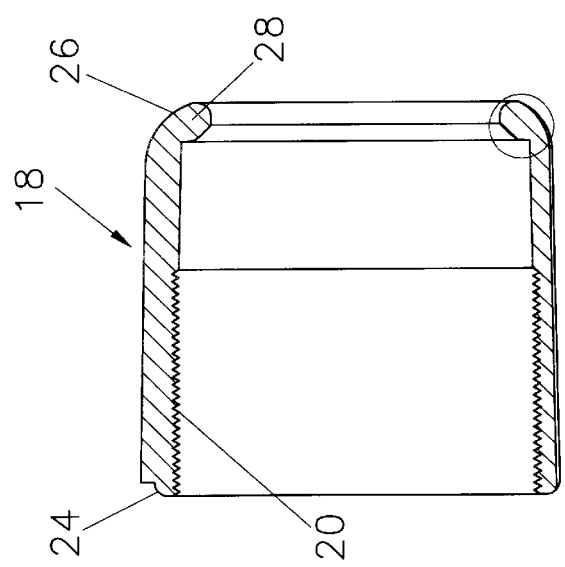
FIG. 10 is a cross-sectional view of the end cap.
Figure 9:
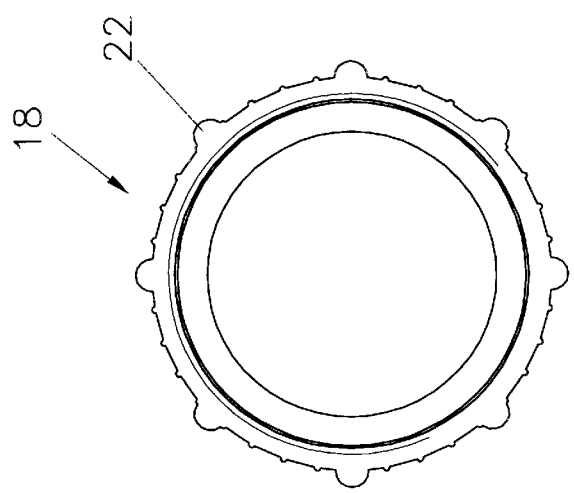
FIG. 9 is a front view of the end cap of the optic fiber inner tube connector in accordance with the present invention

The end cap 18 is a hollow cylindrical member having a central axis and comprising a structure that is best shown in FIGS. 9–11. The end cap 18 comprises an inner threading 20 engageable with the threaded section 16 to have the central axis of the end cap 18 substantially coincident with the central axis of the cylindrical body 12, allowing the inner tube segment 90 to be inserted into the cylindrical body 12 through the end cap 18. The end cap 18 comprises a plurality of ribs 22 formed on outside surface for hand gripping. Alternatively, the ribs 22 may be replaced with other structure of the same function, such as knurling.

Figure 8:
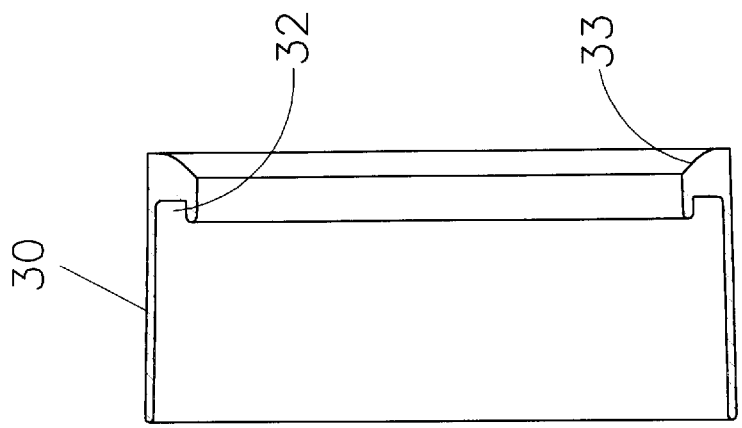
FIG. 8 is a cross-sectional view of the retainer ring.
Figure 7:
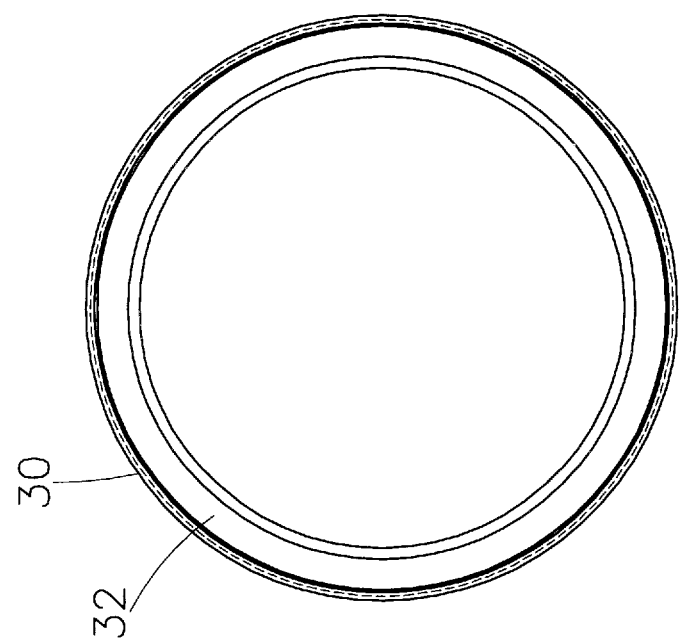
FIG. 7 is a front view of the retainer ring of the optic fiber inner tube connector in accordance with the present invention.
Figure 15:
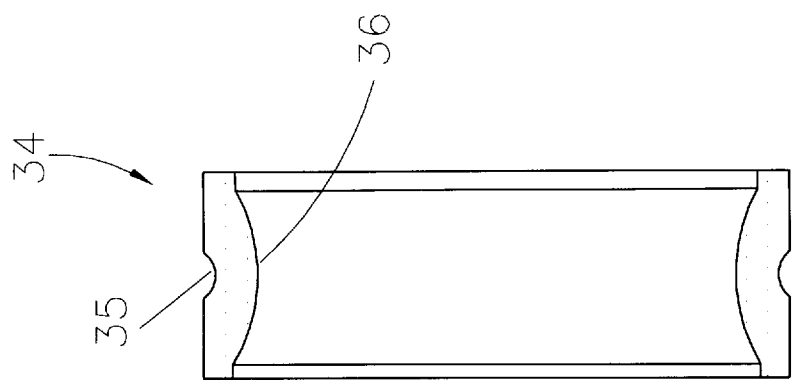
FIG. 15 is a cross-sectional view of the primary sealing ring.
Figure 14:
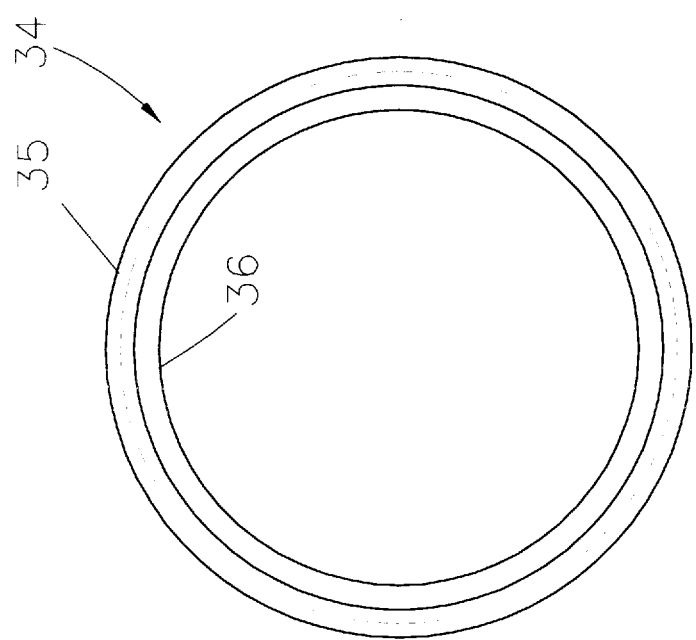
FIG. 14 is a front view of the primary sealing ring of the optic fiber inner tube connector in accordance with the present invention

The end cap 18 which engages the threaded section 16 of the cylindrical body 12 by means of the inner threading 20 comprises a circumferential, radially inward flange 28 which defines a circumferential shoulder for supporting an axial end of an inner tube gripping member 38, see FIGS. 3 and 4. An inclined face 29 is provided on the inside diameter of the inward flange 28, facing axially inward and converging in an axially outward direction to provide a wedging engagement with the gripping member 38 which converts inward axial movement of the end cap 18 relative to the cylindrical body 12 (caused by turning the end cap 18 relative to the cylindrical body 12) into a radial compression acting upon the gripping member 38 to force the gripping member 38 to deform radially inward. This will be further explained hereinafter. In accordance with a preferred embodiment of the present invention, the inclined face 29 is preferably a 45° inclination with respect to the central axis thereof A retainer ring 30 has a cylindrical portion slidably fit on the non-threaded receiving section 19 of the cylindrical body 12 and comprises a circumferential channel 32 formed on the axial outer end of the cylindrical portion to face the axial end of the cylindrical body 12 and axially spaced from the circumferential shoulder 17 of the cylindrical body 12 at a distance sufficient to have a primary sealing ring 34 interposed between the channel 32 and the shoulder 17 of the cylindrical body 12. The retainer ring 30 and the primary sealing ring 34 have an inside diameter large enough to allow the inner tube segment 90 to readily move therethrough . The retainer ring 30 also comprises an inclined face 33 formed on an axially outer end thereof and diverging in an axially outward direction so as to be substantially opposite to the inclined face 29 of the flange 28 of the end cap 18. The inclined face 33, similar to the inclined face 29 of the end cap 18, provides a wedging engagement with the gripping member 38. This will be further described hereinafter. In accordance with a preferred embodiment of the present invention, the inclined face 33, similar to the inclined face 29, has a 45° inclination. The structure of the retainer ring 30 is more clearly shown in FIGS. 7 and 8 which are respectively a front view and a cross-sectional view of the retainer ring 30. The structure of the primary sealing ring 34 is more clearly shown in FIGS. 14 and 15 which are front view and cross-sectional view of the primary sealing ring 34.

With reference to FIGS. 3, 4, 14 and 15, the primary sealing ring 34 is a short cylinder made of a resilient material, having a straight cylindrical outside surface and an arcuated inside surface which is radially inward raised as indicated at 36, so as to have a maximum thickness at an axial center and gradually decreasing in the axial direction toward the two axial ends. The thickness of the primary sealing ring 34 at one of the axial ends of the sealing ring 34 is receivable within the channel 32 of the retainer ring 30 and held therein. The other axial end of the primary sealing ring 34 is fit over and supported on the shoulder 17 of the cylindrical body 12. The retainer ring 30 retains the primary sealing ring 34 between the shoulder 17 of the cylindrical body 12 and the channel 32 and prevents the primary sealing ring 34 from expanding outward when it is subject to an axial force acting thereon. The primary sealing ring 34 also comprises a circumferential groove or notch 35 formed and substantially axially centered on the outside surface of the primary sealing ring 34. The circumferential groover 35, together with the inward raised structure 36 on the inside surface of the primary sealing ring 34, facilitates the radially inward expansion or deformation of the primary sealing ring 34 when it is subject to an axial force. More specifically, when the retainer ring 30 is axially moved relative to the cylindrical body 12 in an inward direction, the primary sealing ring 34 that is interposed between the shoulder 17 of the cylindrical body 12 and the channel 32 of the retainer ring 34 is axially compressed which collapses the groove 35 and forces the retainer ring 34 to expand or deform in the radially inward direction and eventually in tight contact engagement with the inner tube segment 90 to provide an air- and water-tight sealing therebetween.

The cylindrical portion of the retainer ring 30 that extends over the primary sealing ring 34 not only serves to provide a constraint on the deformation direction of the primary sealing ring 34 when the primary sealing ring 34 is subject to an axial force and to maintain the primary sealing ring 34 between the shoulder 17 of the cylindrical body 12 and the channel 32, but also separates the primary sealing ring 34 from the inner threading 20 of the end cap 18 so that the rotation of the end cap 18 with respect to the cylindrical body 12 does not damage the primary sealing ring 34.

Figure 17:
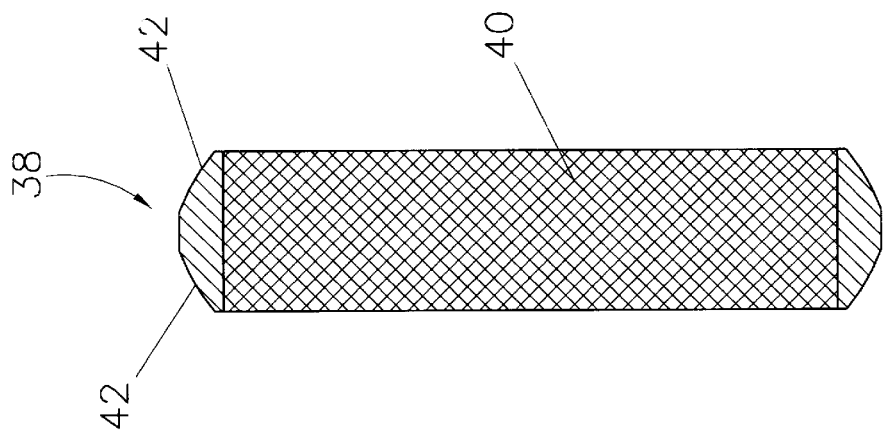
FIG. 17 is a cross-sectional view of the gripping member.
Figure 16:
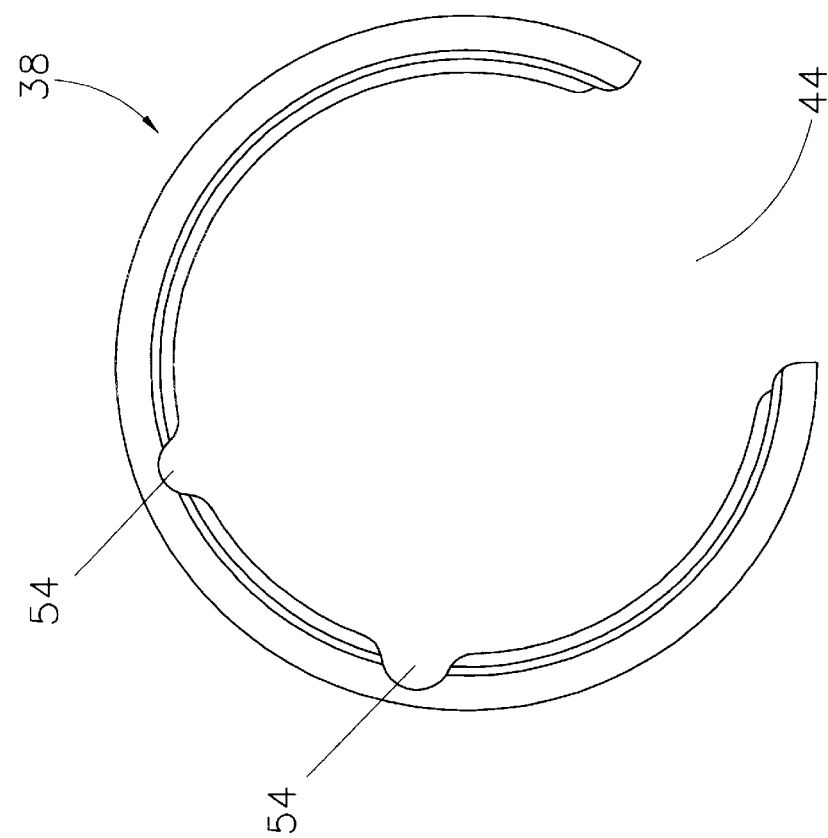
FIG. 16 is a front view of the C-shaped inner tube gripping member of the optic fiber inner tube connector in accordance with the present invention.

As discussed above, the connector 10 also comprises an inner tube gripping member 38, made of a resilient material, which is disposed between the inward flange 28 of the end cap 18 and the axial end of the retainer ring 30. The gripping member 38 has a C-shaped configuration having an opening 44, as more clearly shown in FIGS. 16 and 17 which are respectively a front view and a cross-sectional view of the gripping member 38. As shown in FIG. 17, the gripping member 38 comprises a substantially smooth inside surface on which inner tube catching means 40 is provided. In the embodiment illustrated, the catching means 40 comprises a plurality of fine sharp bosses or teeth formed on the inside surface of the gripping member 38. The sharp teeth 40 are capable to pierce into the inner tube segment 90 when they are forced against the inner tube segment 90 to securely fix the inner tube segment 90 to the connector 10. The C-shaped gripping member 38 has an initial inside diameter which is large enough to allow the inner tube segment 90 to extend therethrough.

The gripping member 38 also comprises two axially opposite inclined faces 42 formed on the outside surface thereof to be respectively in contact and wedging engagement with the inclined face 29 of the end cap 18 and the inclined face 33 of the retainer ring 30. When the end cap 18 is initially tightened on the cylindrical body 12 and thus moved axially inward relative thereto, the gripping member 38 is first deformed axially and then the wedging engagement converts the axial compression into radial compression which deforms the gripping member 38 inward with the deformation thereof being accommodated by the opening 44 of the C-shaped configuration of the gripping member 38. The radially inward compression of the gripping member 38 reduces the inside diameter from the initial inside diameter to a second inside diameter which may be smaller than the diameter of the inner tube segment 90 and during the inward compression, the sharp teeth 40 are forced to pierce into the inner tube segment 90 to securely fix the inner tube segment 90 to the connector 10.

The inclined outside surface configuration of the gripping member 38 may be replaced with an arcuated outside surface configuration which provides similar wedging engagement with the inclined faces 29 and 33.

Preferably, the gripping member 38 further comprises a plurality of notches 54, such as two notches, provided on the inside surface of the gripping member 38 to facilitate the inward compression of the gripping member 38.

Further tightening the end cap 18 relative to the cylindrical body 12 causes the already-deformed gripping member 38 to move axially inward to urge the retainer ring 30 inward and compress the primary sealing ring 34 which is located between the circumferential channel 32 of the retainer ring 30 and the shoulder 17 of the cylindrical body 12. The axially-compressed primary sealing ring 34 then deforms in the radial direction to sealingly engage the outside surface of the inner tube segment 90. Since the gripping member 38 has been deformed to catch the inner tube segment 90, the axial inward movement of the gripping member 38 caused by further tightening the end cap 18 also moves the inner tube segment 90 toward the circumferential rib 70 inside the central bore of the cylindrical body 12 which in turn urges the inner end of the inner tube segment 90 against the second inclined face 80 of the centering and sealing ring 76. Due to a camming and guiding action provided by the second inclined face 80 on the inner end of the inner tube segment 90, the inner tube segment 90 is centered at the central axis of the cylindrical body 12. This allows two inner tube segments 90 which are both centered in the cylindrical body 12 by means of the centering and sealing rings 76 to be in precise axial alignment with each other.

The centering and sealing ring 76 is made of a resilient material which not only centers the inner tube segment 90 within the central bore of the cylindrical body 12, but is also resiliently deformable to sealingly engage the inner end of the inner tube segment 90 when it is urged by the inner end of the inner tube segment 90. Thus, besides centering the inner tube segment 90, the centering and sealing ring 76 also provides a hermetic sealing between the connector 10 and the inner tube segment 90 that is received within the connector 10 which in combination with the sealing engagement of the primary sealing ring 34 with the outside surface of the inner tube segment 90 provides a very effective hermetic sealing between the connector 10 and the inner tube segment 90.

In mounting the inner tube segment 90 into the connector 10, in order to allow the inner tube segment 90 to readily move with the gripping member 38, preferably an axial gap 92 (see FIG. 3) is initially preserved between the inner end of the inner tube segment 90 and the centering and sealing ring 75. The gap 92 is reduced with the axial movement of the inner tube segment 90 caused by the tightening operation of the end cap 18 via the gripping member 38.

In mounting operation, the inner tube segment 90 is inserted into the connector 10 in the axial direction, as shown in FIG. 3, and the associated end cap 18 is tightened, namely rotating in a direction to axially move the end cap 18 inward. Due to tigthtening the end cap 18, the inclined face 29 formed on the inward flange 28 of the end cap 18 and the inclined face 33 of the retainer ring 30 generate a wedging force on the inclined faces 42 formed on the outside surface of the gripping member 38 to urge the gripping member 38 to deform in the radial direction. This forces the gripping member 38 to grip or catch the inner tube segment 90 by means of the catching means 40. Further tightening the end cap 18 urges the retainer ring 30 inward via the already-deformed gripping member 38 and this compresses the primary sealing ring 34 in the axial direction to force the inward raised portion 36 formed on the inside surface of the primary sealing ring 34 to radially deform and sealingly engage the inner tube segment 90. The axial movement of the gripping member 38 with the end cap 18 also causes the inner tube segment 90 to move axially inward so as to have the inner end of the inner tube segment 90 urged against the centering and sealing ring 76 to provide centering and sealing effect on the inner tube segment 90.

Since in accordance with the present invention, during the tightening operation of the end cap 18, the gripping member 38 undergoes a significant radial deformation to engage the inner tube segment 90 by means of the wedging engagement of the inclined faces 42 of the gripping member 38 with the inclined face 33 of the retainer ring 30 and the inclined face 29 of the end cap 18, a large radial clearance may be present between the inner tube segment 90 and the inside surface of the gripping member 38. Also since the gripping member 38 and the sealing ring 34 both are made resilient and thus radially outward expandable, a large manufacturing tolerance on the outside diameter of the inner tube segment 90 may be accommodated by the connector 10 in accordance with the present invention. In accordance with a preferred embodiment of the present invention, a manufacturing tolerance on the outside diameter of the inner tube as large as 10 mm can be accommodated by using the connector of the present invention.

It is apparent that although the present invention is illustrated with the description of the preferred embodiment, it is contemplated that there may be changes and modifications in the described embodiment that can be carried out without departing from the scope of the invention which is intended to be limited only by the appended claims.

What is claimed is:

1. An optic fiber inner tube connector adapted to connect two optic fiber inner tube segments, comprising:

an elongated body having a central bore extending through the length thereof and having a central axis so as to define two axial ends of the body, the body having an outside surface with two threaded sections formed thereon;

an end cap in the form of a cylinder having inner threading engageable with each of the threaded sections of the body so as to be axially movable along the threaded section of the body by rotating the end cap relative to the body, the end cap having an axial outer end on which a circumferential, radially inward flange is formed, having an inside diameter large enough to receive the respective inner tube segment to extend therethrough;

a gripping member made of a resilient material and disposed between the circumferential flange of each of the end caps and the respective axial end of the body, the gripping member having a C-shaped configuration of a first diameter which allows the respective inner tube segment to extend therethrough and having an opening to allow the gripping member to be radially inward deformable with the inside diameter thereof changing from the first diameter to a smaller second diameter to engage the inner tube segment, catching means being provided on the gripping member so that when the gripping member is radially inward deformed to engage the inner tube segment, the catching means securely grips the inner tube segment to securely fix the inner tube segment in the connector;

wedging means which converts the axial movement of each of the end caps into a radially inward deformation of the respective gripping member to force the gripping member to radially inward deform from the first diameter to the second diameter so as to secure the inner tube segment in the connector; and sealing means arranged between the connector body and each of the inner tube segments to provide a hermetic sealing therebetween.

2. The connector as claimed in claim 1, wherein the wedging means comprises an inclined face formed on an outside surface of the gripping member and a mated inclined face formed on the circumferential flange of the end cap which are in camming engagement with each other so that a wedging action is provided therebetween which converts the axial movement of the end cap into radial deformation of the gripping member.

3. The connector as claimed in claim 2, wherein the wedging means comprises two inclined faces formed on an outside surface of the gripping member at two axially opposite ends thereof which inclined faces are in wedging engagement with a mated inclined face formed on the circumferential flange of the end cap and a mated inclined face provided on the respective axial end of the body so that a wedging action is provided between the inclined faces of the gripping member and the mated inclined faces provided on the end cap and the body to convert the axial movement of the end cap into radial deformation of the gripping member.

4. The connector as claimed in claim 3, wherein a retainer ring is provided between the gripping member and the axial end of the body and wherein the inclined face that is provided on the axial end of the body is formed on the gripping member.

5. The connector as claimed in claim 4, wherein the retainer ring has a cylindrical portion movably fit over the axial end of the body and a circumferential channel spaced from the axial end of the body and located between the gripping member and the axial end of the body and wherein the sealing means comprises a primary sealing ring made of a resilient material having an axial end fixed on the axial end of the body and an opposite end received, held and supported in the circumferential channel so that when the end cap is axially moved inward relative to the body and urges the gripping member inward, the retainer ring moves axially inward with the movement of the end cap to compress and deform the primary sealing member to sealingly engage the respective inner tube segment.

6. The connector as claimed in claim 2, wherein the inclined face of the gripping member and the inclined face of the end cap comprise an inclination of 45°.

7. The connector as claimed in claim 1, further comprising a centering and sealing ring located inside the central bore of the connector body to be associated with each of the inner tube segments, the centering and sealing ring having a central axis substantially coincident with the central axis of the connector body, comprising a centering inclined face which converges axially inward at a predetermined angle for centering the respective inner tube segment when an inner end of the inner tube segment is forced to contact the centering inclined face so as to have a radial center of the inner tube segment coincident with the central axis of the connector body.

8. The connector as claimed in claim 7, wherein the connector body comprises a circumferential, inward raised portion formed inside the central bore, having two axially opposite ends, each having a wedge slot formed thereon to receive and hold a second inclined face formed on each of the centering and sealing rings.

9. The connector as claimed in claim 8, wherein the second inclined face of the centering and sealing ring comprises an inclination of 60°.

10. The connector as claimed in claim 7, wherein the centering and sealing ring is made of a resilient material which is deformable when contacted and urged by the inner end of the inner tube segment to provide a hermetic sealing therebetween.

11. The connector as claimed in claim 7, wherein the centering inclined face of the centering and sealing ring comprises an inclination of 45°.

12. The connector as claimed in claim 1, wherein the sealing means comprises a primary sealing ring made of a resilient material having an axial end fixed on the axial end of the body and an opposite axial end received, held and supported by a circumferential channel of a retainer ring, which retainer ring is slidably fit over the axial end of the body with the circumferential channel located between the gripping member and the axial end of the body so that when the end cap is rotated to axially moved inward relative to the body and thus urges the gripping member axially inward, the retainer ring moves axially inward with the movement of the end cap to compress and deform the primary sealing member to sealingly engage the respective inner tube segment.

13. The connector as claimed in claim 12, wherein the primary sealing ring comprises a circumferential, radially inward raised portion formed on an inside surface of the primary sealing ring and deformable to and sealingly engage the respective inner tube segment when the primary sealing ring is axially compressed by the movement of the end cap.

14. The connector as claimed in claim 1, wherein the catching means of the gripping member comprises a plurality of fine sharp teeth provided on an inside surface of the gripping member to pierce into and thus securely fix the inner tube segment in the connector.

15. The connector as claimed in claim 1, wherein the end cap comprises ribs formed on an outside surface thereof for hand gripping.

16. The connector as claimed in claim 1, wherein the gripping member comprises a plurality of spaced notches formed on an inside surface thereof to facilitate the deformation of the gripping member from the first diameter to the second diameter.

* * * * *